UNITED STATES PATENT OFFICE 2,665,213

PROCESS OF MAKING AN ALCOHOLIC MALT BEVERAGE

Shigeru Hayakawa, Musashino-Shi, Tokyo-To, Japan

No Drawing. Application October 13, 1952, Serial No. 314,575

6 Claims. (Cl. 99—31)

This invention relates to a process for making beer synthetically, and its object is to manufacture this beer at low cost and by an extremely quick and simple way.

Beer heretofore was made only by fermentation. Furthermore hop-resin and lupulinous matter are difficultly soluble in water or in wort, and this has been a problem to be studied in its operation, yield, essence, etc.

This invention is a process of obtaining beer by a genuine synthesis in a short time and with the simplest equipment and operation. It has exceptional features of economizing malt or starch materials (less than one-tenth the amount in the fermentation method) and of making use of sufficient amounts of inorganic salts, i. e. water soluble phosphates or sulphates, to dissolve completely the resin and lupulinous matters. It enables one to extract more than three times the amount heretofore possible and in about 30 minutes. Furthermore, when the hop component is subjected to chemical change by a process that produces the same aroma as is formed by the fermentation method, and added to the wort, it simplifies the clarifying process extremely, and it keeps the froth, produced by the frothing agent, three times longer than the usual method, and as to the quality, it is quite the same as the brewed beer.

According to this invention, the said object and advantages of this invention have been accomplished by a process consisting of the following four steps.

The first step: Process of manufacturing clear wort

The wort is prepared by adding water to malt, roasted malt or starch materials and warmed; and the pH of 5 to 6 is kept by adding from 0.3 to 0.5% of inorganic salts, such as a phosphate, sulphate or the like, and lactic acid, then heated and concentrated. Hops are added to it, it is boiled, filtered and brought to rapid cooling, white of egg and tannic acid are added, then heated and filtered.

The second step: Process of forming α-lupulinic acid

Independently of the preceding process, hops are soaked in a 0.1 to 0.5% solution of an inorganic acid, heated and subjected to chemical change. By adding inorganic salts to it, the available component of the hops is completely and rapidly extracted. The liquor, in which α-lupulinic acid is formed, is added to the wort of the first step of process and upon the formation of the isomer of α-lupulinic acid, it gives a concocted liquor of higher transparency.

The third step: Process of manufacturing frothing agent

To the clear filtrate, obtained at the first step of process, malt and water are added, heated and the wort is obtained. After boiling and filtering white of egg and tannic acid are added, boiled and filtered. Then, by half and half boiling method, the concentration is repeatedly done to the limiting point. It gives a perfectly emulsified frothing agent of more than 1,000 times longer froth-holding power than the usual one.

The fourth step: Process of mixing and flavoring

To the concocted liquor obtained at the second step, the frothing agent of the third step and caramel, sodium lactate, sodium chloride, lactic acid and orizanine essence (vitamin B) are successively added and well stirred. White of egg and tannic acid are added to it, heated and filtered, a measured amount of this put into a vessel and double the quantity of carbonated water is added and tightly stoppered and thus the product is obtained.

This invention will be more clearly understood from the following explanation in connection with experimental examples. Comparing the limpidity of the malt liquor at the first step of the process with and without addition of inorganic salts, it is as follows:

Table for the comparison of the characteristics with and without the addition of an inorganic salt.

| Characteristics | Parts phosphate added | Sulphate added | without addition of inorganic salt |
|---|---|---|---|
| Time of dissolution of resin | 30 min | 30 min | 60 min. |
| Solubility of resin | 100% | 98% | 30%. |
| Frothiness | 100 | 95 | 30. |
| Size of froth | Fine | Fine | Coarse. |
| Color tone | Brownish red | Brown | Yellow. |
| Refractive index | 4.0 | 3.8 | 2.7. |
| Bitterness | 100 | 95 | 30. |
| pH | 5.4 | 5.8 | 6.5. |
| Flavor | Good | Good | Bad. |

Remarks:
1. Time of dissolution of resin: the time required after reaching 100° C.
2. Solubility of resin: comparative value on the results by the normal method of analyses for resin.
3. Frothiness: twice the bulk of carbonated water is poured into the test-liquors and stoppered; after cooling it to 10° C., it is uncorked. Frothiness is given by the comparative value of the height of the froth column.
4. Refractive index: Index, read by a portable refractometer used for sugar measurement.
5. Bitterness: the dilution ratio for the same bitter taste, when diluted with water.

Namely, when the liquor obtained at the first step of process was compared with and without the addition of phosphate and sulphate, the solubility of resin was extremely low in case without the addition, therefore, the time of dissolution was doubled, yet the resin was immediately precipitated and its solubility was only one third, the frothiness, also one third of the case with the addition of phosphate. Besides, the size of the froth differed obviously and the bitterness was far milder in the case of the addition of inorganic salts.

As for the characteristic point of the flavor, it can be ascribed to the lupulinic acid, the bitter acid component of hops, which undergoes chemical change by the action of microbes and enzymes at the fermentation, and whereby the $\beta$-lupulinic acid is converted into $\alpha$-lupulinic acid. Here, in this case however, it is not carried out by the fermentation method, but the $\beta$-compound can completely be converted into $\alpha$-compound by causing it to be soaked and extracted in the inorganic acid solution and thereafter steamed and boiled. Namely, a minute study of the molecular constitution of the present method, revealed that the inter-molecular bond of the $\beta$-lupulinic acid is loosened by the impregnating force of the inorganic acid and thereupon, it is intended to split off the valeraldehyde by heating the solution.

The chemical change is as follows:

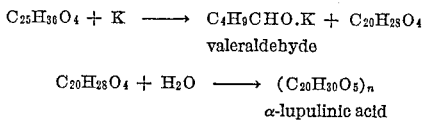

$$C_{25}H_{36}O_4 + K \longrightarrow C_4H_9CHO.K + C_{20}H_{28}O_4$$
$$\text{valeraldehyde}$$

$$C_{20}H_{28}O_4 + H_2O \longrightarrow (C_{20}H_{30}O_5)_n$$
$$\alpha\text{-lupulinic acid}$$

Such a change, i. e. the splitting off of valeraldehyde occurs at the chain bond of the $\beta$-lupulinic acid, the component of hops, which is completely extracted by inorganic salts and contained in the concocted liquor, prepared by mixing the liquids at every step of the process, thus it can be converted into $\alpha$-lupulinic acid. Therefore, the component and the flavor quite similar to the brewed beer are easily formed and besides the aroma of valeraldehyde is further raised without depending on the fermentation method, i. e. due to the action of microbes.

Furthermore, as to the product of the present method, the operation and the chemical change are completely conducted as described above and thereafter the carbonated water poured into it, therefore the manufactured product can be preserved in a perfect stable state, and consequently, there is not the least formation of turbidity precipitation. The product is altogether excellent in its stability as it can stand for a long period.

The product thus obtained does not differ in flavor from brewed beer, the frothing is also perfect and stable in its quality. It is distinguished not only by its very low production cost but also by the advantage that the content of alcohol and other ingredients can be arbitrarily adjusted according to one's taste.

The half and half boiling method, adapted at the above third step, is a scheme originated in this invention. For instance, 200 cc. of starting malt liquor is divided into two equal parts and 100 cc. of it is boiled and concentrated to 50 cc. This is put together with the remaining 100 cc. making 150 cc. which is again divided in two equal parts. The 75 cc. is concentrated to its half 37.5 cc. and returned to the remaining bulk, making 102.5 cc. Half of this (52 cc.) is concentrated to 26 cc. and put together with the remaining bulk which makes 78 cc. This concentrated liquor gives the frothing agent.

In the above mentioned boiling method, as a part of the whole bulk is always not exposed to the heat, therefore, even when concentrated to the utmost, the frothiness is kept large and shows 1,000 times stronger. On the contrary, if the whole bulk is boiled and concentrated from the start, it is affected by the heat and other actions and it suffers change and the frothiness is decreased.

The object of manufacturing frothing agent by this process, lies in preventing the precipitation of the hop-resin, dissolved in the filtrate, and emphasis is laid upon the concentration method, in which the caramelization of the contained sugar is checked to the minimum and besides, the heating is done without the coagulation of the contained protein, and to bring sugar, protein, and resin in contact and thereby increase in balance the froth-holding power due to the resin, the frothiness due to the protein, and the consistency due to the sugar. As a result, the frothing as well as the froth-lasting show an excellent effect in the synthesized beer and by no means inferior to the brewed beer. In brief, the present method takes advantage of the colloidal chemical characteristics of the three substances, resin, sugar and protein. By the gradual and unforced concentration process, the molecular activity is kept in equilibrium and thereby prevent the separation of the resin and avoids the coagulation of the protein. There is no formation of turbidness at the end of an extended long period as in the case of beer made by the fermentation process. There is a marked difference in the value of the product and also in its preservability.

An example of the actual operation of this invention may be given as follows:

*The first step: Manufacture of the clear saccharified liquor (wort)*

2,500 cc. of water is added to 80 gr. malt, 8 gr. roasted malt and heated for 30 minutes at 60° C. Inorganic salts (0.3–0.5% of potassium phosphate, or potassium sulphate) are added to the above and the pH kept at 5 to 6 by the addition of lactic acid. Half its volume is separately boiled, concentrated and put back in the remainder, which makes 2,000 cc. of liquor, whose saccharinity (sugar content) is 3.5°. Next, 10 gr. of hops is added, boiled for 15 minutes and again 10 gr. of hops is added and boiled for 15 minutes. While boiling, warm water is supplied to bring the liquor finally to 2,000 cc.

*The second step: Formation of $\alpha$-lupulinic acid*

To 1,000 cc. of water, 10 cc. of 38% hydrochloric acid is added and 30 gr. of hops is soaked in it, whereby the molecular bond of $\beta$-lupulinic acid is loosened by the permeability of the mineral acid. Next, the valeraldehyde, aromatic component of hops, is split by steaming and boiling. 5 gr. of potassium phosphate is added and boiled, then 3 gr. of calcium carbonate added and the pH is adjusted to 6 to 7. Thus 900 cc. of converted $\alpha$-lupulinic acid are obtained. This is combined with 2,000 cc. of the clear liquor obtained at the preceding step of process, which makes 2,900 cc. of concocted liquor.

The third step: Manufacturing of the frothing agent

To 60 cc. of the filtrate obtained at the first step of process, 250 cc. of water and 60 gr. of malt are added, heated at 60° C. for 5 to 8 hours for the extraction. 250 cc. of the wort thus obtained is boiled, filtered, which makes 220 cc. of the filtrate as in the previous operation and 200 cc. of clear filtrate is obtained. This is subjected to half and half boiling method as previously described and 76.5 cc. of frothing agent is obtained.

In this case, from 3 to 4 steps of concentration are most adequate, at which the frothing effect is at its best and shows 1,000 times stronger. The concentration is suspended at the limit just before the separation of hop-resin and the coagulation of protein occur.

The fourth step: Mixing and flavoring

To 2900 cc. of the concocted liquor of the first and second steps, 20 cc. of the frothing agent of the third step is added. To this are added 770 cc. of 50% alcohol; 6 cc. of 75% lactic acid; 0.2 gr. of sodium succinate; 50 gr. of glucose, 0.05 gr. of orizanine (vitamin B), 5 cc. of essence, 0.5 gr. of caramel, 2 cc. of glycerine and 10 gr. of dextrine are added, well stirred, then white of egg and tannic acid added to it, similar to the previous operation clarified and thus a clear liquor is obtained.

Next, for example into a vessel of a capacity of 630 cc. is put 210 cc. (one third the volume) of the clear liquor and 420 cc. (two thirds of the volume) of carbonated water under 50 lbs. pressure and the vessel is stoppered. This gives the synthetic beer product.

The composition of the synthetic beer, obtained by the above processes of the present invention, is as follows:

| | Per cent |
|---|---|
| Alcohol | 3.8 |
| Extract | 5.5 |
| Nitrogen | 0.07 |
| Glycerine | 0.01 |
| Carbonic acid | 0.4 |
| Phosphoric acid | 0.07 |
| Ash | 0.2 |
| Sugar | 1.25 |
| Lactic acid | 0.08 |
| Dextrine | 2.05 |

The composition and the flavor is similar to the brewed beer and it is an ideal, excellent beverage. Occasionally the content of alcohol may be reduced to less than 1%, suitable for a soft drink within the tax law. Yeast may be added to this product for further improvement of its flavor.

As many different embodiments of this invention may be made without departing from the spirit and scope thereof, it is to be understood that I do not limit my invention to the specific embodiments thereof except as defined in the appended claims.

What I claim is:

1. The process of making an alcoholic malt beverage which consists in heating water, malt and starchy material with sufficient lactic acid to maintain a pH of 5 to 6 and in the presence of from 0.3 to 0.5% of a salt of the group consisting of inorganic phosphates and sulphates, boiling, clarifying and concentrating the wort, boiling it with hops; separately extracting hops with a dilute solution of acid; boiling the extract; adding a phosphate and again boiling; adjusting the pH to from 6 to 7 by calcium carbonate; separately evaporating a portion of the said wort to substantially one third its original volume to make a frothing agent; combining the wort, hop extract and frothing agent with alcohol, diluting the mixture with carbonated water and bottling.

2. The process of making an alcoholic malt beverage which consists in heating water, malt and starchy material with sufficient lactic acid to maintain a pH of 5 to 6 and in the presence of from 0.3 to 0.5% of a salt of the group consisting of inorganic phosphates and sulphates, boiling, clarifying and concentrating the wort, boiling it with hops; separately extracting hops with a dilute solution of acid; boiling the extract; adding a phosphate and again boiling; adjusting the pH to from 6 to 7 by calcium carbonate separately evaporating a portion of the said wort to substantially one third its original volume to make a frothing agent; combining the wort, hop extract and frothing agent, adding alcohol, lactic acid flavoring substances; diluting the mixture with carbonated water and bottling.

3. The process of making an alcoholic malt beverage which consists in heating water, malt and starchy material with sufficient lactic acid to maintain a pH of 5 to 6 and in the presence of from 0.3 to 0.5% of a soluble inorganic phosphate, boiling, clarifying and concentrating the wort, boiling it with hops; separately extracting hops with a dilute solution of acid; boiling the extract; adding a phosphate and again boiling; adjusting the pH to from 6 to 7 by calcium carbonate; separately evaporating a portion of the said wort to substantially one third its original volume to make a frothing agent; combining the wort, hop extract and frothing agent with alcohol, diluting the mixture with carbonated water and bottling.

4. The process of making an alcoholic malt beverage which consists in heating water, malt and starchy material with sufficient lactic acid to maintain a pH of 5 to 6 and in the presence of from 0.3 to 0.5% of a soluble inorganic sulphate, boiling, clarifying and concentrating the wort, boiling it with hops; separately extracting hops with a dilute solution of acid; boiling the extract; adding a phosphate and again boiling; adjusting the pH to from 6 to 7 by calcium carbonate; separately evaporating a portion of the said wort to substantially one third its original volume to make a frothing agent combining the wort, hop extract and frothing agent with alcohol, diluting the mixture with carbonated water and bottling.

5. The process of making an alcoholic malt beverage which consists in heating water, malt and starchy material with sufficient lactic acid to maintain a pH of 5 to 6 and in the presence of from 0.3 to 0.5% of a soluble inorganic phosphate, boiling and clarifying; concentrating a portion of the wort, returning it to the remainder, boiling with hops, separately extracting hops with a dilute solution of hydrochloric acid; boiling the extract; adding a phosphate and again boiling; adjusting the pH to from 6 to 7 by calcium carbonate; separately evaporating a portion of the wort to substantially one third its original volume to make a frothing agent; combining the wort, hop extract and frothing agent with alcohol and diluting the mixture with carbonated water and bottling.

6. In the making of a malt beverage, the process which consists of heating water, malt and starchy material with sufficient lactic acid to maintain a pH of 5 to 6 and in the presence of from 0.3 to 0.5% of a salt of the group consisting of inorganic phosphates and sulphates, boiling, clarifying and concentrating the wort, boiling it with hops; separately extracting hops with a dilute solution of acid; boiling the extract; adding a phosphate and again boiling; adjusting the pH to from 6 to 7 by adding calcium carbonate; separately evaporating a portion of the said wort to substantially one third of its original volume to make a frothing agent; combining the wort, hop extract and frothing agent and adding alcohol, lactic acid and flavoring substances.

SHIGERU HAYAKAWA.

References Cited in the file of this patent

UNITED STATES PATENTS

| Number | Name | Date |
| --- | --- | --- |
| 981,325 | Stein | Jan. 10, 1911 |
| 1,262,472 | Eisenbeiss | Apr. 9, 1918 |